United States Patent Office 2,928,799
Patented Mar. 15, 1960

2,928,799

COMPOSITION COMPRISING AN ORGANOPOLY-SILOXANE, A TITANATE AND A WAX AND PROCESS FOR RENDERING TEXTILES WATER REPELLENT THEREWITH

Donald V. Brown, Schenectady, N.Y., assignor to General Electric Company, a corporation of New York No Drawing. Application May 13, 1957
Serial No. 658,498

6 Claims. (Cl. 260—28)

This invention relates to organopolysiloxanes capable of rendering porous materials water-repellent without requiring heat to bring out the optimum water-repellency of the treated surface. More particularly, the invention relates to a composition of matter comprising, by weight, (1) from 10 to 60 percent of a titanium compound selected from the class consisting of (a) orthotitanates having the general formula Ti(OR)$_4$ where R is selected from the class of aliphatic hydrocarbon radicals of less than twelve carbon atoms and hydroxylated and aminated aliphatic hydrocarbon radicals of less than twelve carbon atoms and containing less than four hydroxy radicals, and (b) aliphatic hydrocarbon-soluble partial hydrolyzates of (a), (2) from 25 to 75 percent of a methylpolysiloxane copolymer containing trimethylsiloxy units and SiO$_2$ units, there being present in said copolymer from 1 to 1.25 methyl groups per silicon atom, (3) from 10 to 50 percent of a fluid organopolysiloxane having the formula

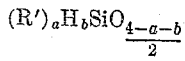

where R′ represents a monovalent hydrocarbon radical free of any substitution on the hydrocarbon radical, $a$ has a value of from 1.0 to 2.25, inclusive, $b$ has a value of from 0 to 1.25, the sum of $a$ and $b$ being equal to from 1.96 to 2.25, inclusive, the said organopolysiloxane having a viscosity of from 5 to 1,000,000 centistokes when measured at 25° C., and (4) a wax.

Among the values which R′ may be are, for instance, alkyl radicals (e.g., methyl, ethyl, propyl, hexyl, dodecyl, etc.); aryl radicals (e.g., phenyl, naphthyl, biphenyl, etc.); alkaryl radicals (e.g., tolyl, xylyl, etc.); aralkyl radicals (e.g., benzyl, phenylethyl, etc.).

Various means have been employed in the past to impart water-repellency to textiles employing organopolysiloxanes for the purpose. This treatment has usually involved using methyl hydrogen polysiloxanes, together with catalysts such as lead octoate, tin naphthenate, etc. which convert these methyl hydrogen polysiloxanes to the cross-linked state. In general, such conversion requires the application of elevated temperatures, for instance, from 150 to 200° C. for varying lengths of time in order to obtain an optimum degree of water-repellency. The use of methyl hydrogen polysiloxanes for this purpose is disclosed in such patents as, for instance, Dennett 2,588,366 and Rasmussen 2,612,482.

The type of applications described above have been generally successful on a commercial scale when employed in textile mills during fabric finishing operations. However, this technology is not applicable to a consumer product application because the methyl hydrogen polysiloxane is usually not stable for a sufficient length of time in the presence of catalysts to render it usable on a small scale home use. Moreover, the requirement of a heating cycle to bring out the optimum cure and water-repellency is obviously not practical for home applications because of the lack of adequate facilities, including means for applying the water-repellent.

U.S. Patent 2,672,455, Currie, issued March 16, 1954, discloses, for the purpose of rendering leather water-repellent, a mixture of ingredients comprising a titanate, a methylpolysiloxane copolymer composed of trimethylsiloxy units and SiO$_2$ units, and an organopolysiloxane containing from 2 to 2.9 organic groups per silicon atom in which the organic radicals are selected from the class consisting of alkyl radicals, alkenyl radicals and monocyclic aryl radicals, i.e., hydrocarbon radicals of the aryl type which are free of substitution. However, I have found that compositions, such as those disclosed and claimed in the aforesaid Currie patent, wherein R″ in the formula

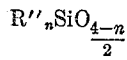

is a methyl radical, when applied to textiles, for instance, cotton, fail to give any evidence of satisfactory water-repellency on the cotton, and in most cases the spray ratings using such polysiloxane materials is zero. Even if the organopolysiloxane corresponding to the formula

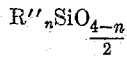

contains both methyl groups and unsubstituted phenyl groups, the spray rating, for instance, on cotton, is erratic and lower than is desired.

I have unexpectedly found that, despite the fact that the above-identified leather water-repellent compositions are unsuitable for rendering textiles, for instance, cotton fabrics, water-repellent, by incorporating in the water-repellent a wax, for instance, paraffin wax, in an amount equal to, by weight, from about 20 to 90% of the total weight of the organotitanate, the methylpolysiloxane copolymer and the fluid organopolysiloxane containing hydrocarbon groups free of substitution, I can increase the spray rating of textile materials treated with such compositions from 0 to 100 and thereby increase the versatility of such leather water-repellent compositions.

It is, therefore, one of the objects of this invention to obtain good water-repellency on textiles without requiring elaborate means of application of the water-repellent.

It is another object of the invention to render textile surfaces, particularly cotton surfaces, water-repellent by convenient means without requiring heat to bring out the optimum water-repellency.

It is still a further object of the invention to render surfaces of garments water-repellent by means of convenient containers capable of being economically and practically used at home without requiring complicated equipment or specialized conditions for applications.

Other objects of the invention will become more apparent from the following description thereof.

All the foregoing objects and desirable results are attained by employing in the water-repellent treating composition a mixture of ingredients in certain proportions comprising the aforesaid organotitanate, the methylpolysiloxane copolymer composed of trimethylsiloxy units and SiO$_2$ units, and an organopolysiloxane fluid in which the organic groups are hydrocarbon radicals free of any substitution, and a wax. This mixture of ingredients is conveniently applied from an aerosol container from which the water-repellent composition is expelled onto the surface it is desired to treat by means of gaseous propellants in the form of a mist or spray of fine particles, wherein the propellant is a liquefied gas having a vapor pressure at room temperature (27° C.) sufficiently high to vaporize rapidly at room temperature and to propel the water-repellent composition onto the surface being rendered water-repellent. The hereindescribed and claimed water-repellent compositions can be readily applied to porous surfaces, particularly textile surfaces, such as cotton, by convenient means, such as from the aforesaid aerosol container, and the treated surface is readily converted to a highly water-repellent state without the necessity of using heat to bring out the optimum degree of water-repellency. Moreover, the mixture of ingredients used is stable indefinitely, and requires no special precautions in handling or in storage as do the water-repellents based on methyl hydrogen polysiloxanes, which tend to release hydrogen on standing.

The methylpolysiloxane resinous copolymer containing trimethylsiloxy units and $SiO_2$ units (hereinafter referred to as "methylpolysiloxane copolymer") may be prepared by various means. One method comprises cohydrolyzing a compound having the formula $(CH_3)_3SiX$ and with a compound having the formula $SiX_4$, where X is a hydrolyzable radical, e.g., chlorine, bromine, fluorine, alkoxy (e.g., methoxy, ethoxy, etc.) radicals, acyloxy radicals, etc., employing such proportions of ingredients as are necessary to obtain the desired methyl/Si ratio of from 1 to 1.25 methyl groups per silicon atom. Instead of employing with the trimethyl hydrolyzable silane, monomeric tetrahydrolyzable silanes of the formula $SiX_4$ mentioned before, one can also employ polymeric alkyl silicates derived from the controlled hydrolysis of the monomeric orthosilicate, wherein the polymeric alkyl silicate composition contains some silicon-bonded hydroxy groups.

The methylpolysiloxane copolymer is advantageously prepared by effecting cohydrolysis of the trialkyl hydrolyzable silane and an alkyl silicate (this designation "alkyl silicate" is intended hereinafter to include both the monomeric and polymeric forms of the alkyl silicate) by adding the trialkyl hydrolyzable silane and the alkyl silicate to a suitable solvent, such as toluene, benzene, xylene, etc., and thereafter adding the solution of the ingredients to a sufficient amount of water to effect the desired hydrolysis and co-condensation in a suitably acidic medium. The choice of the solvent will depend on such considerations as, for instance, the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not effect adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of cohydrolyzate, that is, the trialkyl hydrolyzable silane and the alkyl silicate.

The amount of water used for hydrolysis purposes is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water will generally be determined by the ease with which the cohydrolyzate can be processed to isolate the cohydrolysis product or resin. The amount of water used should be at least from 2 to 3 mols water per total molar concentration of the trialkyl hydrolyzable silane and the alkyl silicate. In general, the amount of water used should be as low as possible to assist in good yields of the methylpolysiloxane copolymer resin, while utilizing to the fullest extent the space available in equipment used for hydrolysis purposes. An upper range of water which may be used with satisfactory results is that of the order of about 40 to 50 mols per mol of the mixture of trialkyl hydrolyzable silane and alkyl silicate. For each mol of the trialkyl hydrolyzable silane, I preferably use from 1 to 2 mols of the alkyl silicate, advantageously within the range of from about 1.2 to 1.8 mols of the alkyl silicate, per mol of trialkyl hydrolyzable silane. In the preparation of the resin, one may add up to 25 percent, by weight, preferably from 3 to 15 percent, by weight, based on the weight of the trialkyl hydrolyzable silane, of other cohydrolyzable materials, such as dimethyldiethoxysilane, dimethyldichlorosilane, diphenyldichlorosilane, methyl phenyldichorosilane, methyltrichlorosilane, etc., to give difunctional or trifunctional siloxy units of the formula $(R'')_2SiO$ and $R''SiO_{3/2}$ where $R''$ is a monovalent hydrocarbon radical, e.g., methyl, ethyl, butyl, decyl, phenyl, benzyl, etc., radical. However, satisfactory properties in the material are often realized without these additional difunctional or trifunctional units and may be omitted if desired.

In preparing the resin, the trialkyl hydrolyzable silane and alkyl silicate are dissolved in a suitable solvent, and added with stirring to the water of hydrolysis, advantageously using temperatures of from 60° C. to 85° C. Thereafter, the two-phase system thus obtained is processed to remove the water-alcohol layer and the remaining resinous material is neutralized with a sufficient amount of sodium bicarbonate or other alkaline material to give to the resin a pH of at least about 6 or 7. Thereafter, the resin is filtered and advantageously adjusted to a resinous solids content of about 30 to 65 percent, using, where necessary, additional amounts of solvent such as toluene, xylene, etc., in order to avoid premature gelation of the resin and to maintain its stability for a time sufficient to permit its use with the other ingredients.

The presence of dimethylsiloxy units of the formula

intercondensed with the methylpolysiloxane copolymer is not precluded. Thus, in addition to trimethylsiloxy units and $SiO_2$ units, one can have intercondensed dimethylsiloxy units which, as pointed out above, can be obtained by cohydrolyzing trimethylchlorosilane, an alkyl silicate, e.g., ethyl silicate, and dimethyldichlorosilane in which the latter is present in an amount ranging up to 25 weight percent of the weight of the trialkyl hydrolyzable silane used to make the methylpolysiloxane copolymer.

The titanium compound suitable for employment in the composition of this invention may be monomeric orthotitanates of the formula $(RO)_4Ti$ or polymers of the orthotitanate having the formula

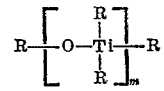

where R is an alkyl radical which may be saturated and unsaturated and includes methyl, ethyl, propyl, butyl, decyl, undecyl, lauryl, palmityl, oleyl, etc., radicals, and $m$ is an integer greater than 1. Preferably R is an alkyl radical containing from about 3 to 10 carbon atoms. The alkyl radicals on the oxygen attached to titanium may also have attached thereto hydroxyl or amino radicals so that the titanate contains hydroxylated or amino-substituted aliphatic hydrocarbon radicals. Among such titanium esters may be mentioned, for instance, tetramethyl titanate, tetraethyl titanate, tetrabutyl titanate, tetradecyl titanate, octylene glycol titanate, tetradodecyl titanate, tetra-(hydroxyethyl) titanate, tetra-(hydroxybutyl) titanate, tetra-(aminoethyl) titanate, tetra-(methylaminobutyl) titanate, etc. Methods for preparing such titanates are found described in U.S. Patent 2,672,455, issued March 16, 1954. Titanium esters wherein R is the same or mixed radicals are likewise suitable.

Partially hydrolyzed compounds of the aforesaid class of orthotitanates obviously also may be used and preferably one employs particularly those partial hydrolyzates which are soluble in the solvents and the gaseous propellants which are to be used in the aerosol container. Additional examples of polymeric organotitanates which may also be used are, e.g., polymers of tetraorgano derivatives of orthotitanic acid, including the tetra esters, tetra anhydrides, and tetra amides, many examples of which are described in U.S. 2,769,732, issued November 6, 1956.

The organopolysiloxane fluids employed in the practice of the present invention in which the organic groups are free of substitution have the general formula

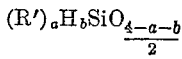

$$(R')_a H_b SiO_{\frac{4-a-b}{2}}$$

where R' is a monovalent hydrocarbon radical free of substitution, e.g., alkyl or alkenyl radicals of less than 4 carbon atoms, or monocylcic aryl radicals, and $a$ and $b$ having the meanings given above. Preferably R' is a member selected from the class consisting of lower alkyl radicals (e.g., methyl, ethyl, propyl, etc., radicals) and cyclic aryl radicals (e.g., phenyl, naphthyl, benzyl, tolyl, xylyl, phenylethyl, etc., radicals). Specific examples of operative polysiloxanes are dimethylpolysiloxanes, vinyl methylpolysiloxanes, phenyl ethylpolysiloxanes, dipropylpolysiloxanes, methyl xenyl polysiloxanes, etc. or mixtures thereof. Also copolymers of such diorganosiloxanes or triorganosiloxanes, such as trimethylsiloxane, phenyldimethylsiloxane, etc., are also operative. Traces of mono-organosiloxane units, for instance, mono-methylsiloxy units of the formula $CH_3SiO_{3/2}$ may also be present in the siloxanes as long as the value of $a$ remains substantially in the range specified. These organopolysiloxanes are benzene-soluble materials which vary in viscosity from thin fluids to very high viscosity polymers. Generally preferred are fluid polymers having viscosities ranging from about 5 to 1,000,000 centistokes at 25° C. and preferably within the range from about 10 to 10,000 centistokes when measured at 25° C. One method for preparing these organopolysiloxane fluid compositions comprises cohydrolyzing in the proper proportions, trimethylchlorosilane, dimethyldichlorosilane or diethyldichlorosilane, as well as any other organochlorosilanes which may be employed, for instance, diphenyldichlorosilane, methyl phenyldichlorosilane, etc. Obviously, the proportions of the chlorosilanes may be varied keeping in mind that the ratio of organic groups per silicon atom is preferably within the range of from 2 to 2.9 organic groups per silicon atom.

It will, of course, be apparent to those skilled in the art that in addition to the methylchlorosilanes employed above, ethylchlorosilanes may also be used, as well as other hydrolyzable lower alkyl silanes containing silicon-bonded hydrogen in addition to hydrolyzable groups other than the chlorine atoms may be employed. The presence of, for instance, methyltrichlorosilane or other lower alkyl trihydrolyzable silanes or trimethylchlorosilane or other tri-substituted lower alkyl monochlorosilanes (or alkoxy silanes) in preparing the organopolysiloxane fluids is not precluded as long as the molar concentration is preferably below 10 to 15 mol percent.

The titanate, methylpolysiloxane resinous copolymer, and the organopolysiloxane free of substitution on the organic group (hereinafter referred to as "organopolysiloxane fluid") are advantageously mixed with a suitable solvent for the mixture of ingredients for instance, a Stoddard solvent which is an aliphatic hydrocarbon solvent comprising a petroleum distillate of which at least 50% distilled below 350° F. and essentially all of the distillate distilled up to 410° F., or mineral spirits, and thereafter combined with a liquefied gas which will be used as the propellent for the mixture of polysiloxanes and the titanate. These liquefied gases or propellents are volatile liquid carriers which are a solvent for the ingredients mentioned above, specifically the titanate, the methylpolysiloxane copolymer, and the organopolysiloxane fluid. They normally have a vapor pressure at 70° F. exceeding 20 lb./sq. in gauge and are able to induce expulsion of the above mixture of titanate and organopolysiloxanes in extremely small average particle size, preferably within the range of about 10 to 100 microns. These propellents (which are also sold under the name "Freons" or "Genetrons") are non-toxic, have a high flash point, and are non-inflammable. In general, they are chlorinated, fluorinated alkanes, examples of which are dichlorodifluoromethane, dichlorofluoromethane, chlorodifluoromethane, trichloromonofluoromethane, difluorodichloroethane, etc. Obviously, mixtures of these chlorinated, fluorinated alkanes may also be employed to advantage. More particular directions and examples for using these propellents, particularly the Freon propellents, are found in a booklet issued by E. I. du Pont de Nemours & Company, Wilmington, Delaware, entitled "Package for Profit."

In addition to the propellent, other solvents may be employed, for instance, the above-mentioned mineral spirits, acetone, chlorinated hydrocarbons (e.g., trichloroethylene, ethylene dichloride, etc.), ethers, etc.

When employing the above mixture of ingredients, the proportions are advantageously varied within certain limits. Generally I prefer that of the mixture of the titanium compound, the methylpolysiloxane copolymer, and the organopolysiloxane fluid, on a weight basis, these ingredients comprise from 10 to 60 percent of the titanium compound, from 25 to 75 percent of the methylpolysiloxane copolymer, and from 10 to 50 percent of the organopolysiloxane fluid.

When employed in the form of an aerosol bomb mixture, the ingredients are advantageously present, by weight, in the following amounts:

| | Parts |
|---|---|
| Organotitanate (which includes polymeric organotitanates) | 0.5 to 5 |
| Methylpolysiloxane copolymer | 0.5 to 5 |
| Organopolysiloxane fluid | 0.5 to 5 |
| Wax | 0.5 to 12 |
| Non-propellent solvent (e.g., mineral spirits) | 5 to 60 |
| Gaseous propellent | 40 to 120 |

I have found that solid paraffin waxes which are soluble in the solvent as well as in the liquefied propellent are advantageously employed in the practice of my invention. The paraffin wax (or other wax which is used) is preferably present on a weight basis in an amount equal to from 10 to 100% or more of the total weight of the organotitanate, the methyl polysiloxane copolymer and the organopolysiloxane fluid. The term "paraffin wax" is intended to include waxes melting, for instance, from about 35° to 200° C. or higher, but which are soluble in the solvent used in dissolving the other ingredients and preferably soluble as well in the liquefied propellent. These are generally high melting hydrocarbons which are constituents of petroleum. They may have the formula $C_xH_{2x+2}$, where $x$ is a value well above 1, e.g., 18 to 70 or even much higher. Other waxes may be employed, such as beeswax, synthetic hydrocarbon waxes, microcrystalline and oxidized microcrystalline waxes, ceresin wax, Japan wax, halogenated paraffins (e.g., Halowax, etc.), etc. Additional examples of suitable waxes may be found in the book The Chemistry and Technology of Waxes by Albin H. Warth, published by Reinhold Publishing Corporation, New York, N.Y. (2nd edition, 1956).

The spray ratings in the following illustrative examples were determined in accordance with the method set forth in the 1945 Yearbook of the American Association of Textile Chemists and Colorists, volume 22, pages 229–233. A spray rating of 100 is indicative of a textile's ability to shed all drops of water which may have impinged on the surface of a textile upon slight shaking of the textile surface.

In order that those skilled in the art may better understand how the present invention may be practiced, the following examples are given by way of illustration and not by way of limitation. All parts are by weight.

The compositions described in the following examples were tested for their water-repellency on textiles by placing them in aerosol bombs or pressure vessels having a pressure valve nozzle. The liquefied propellent gases employed were composed of Freon 11 (trichlorofluoromethane) and Freon 12 (dichlorodifluoromethane) in equal parts by weight, unless otherwise stated. In each instance, the cotton material (which is unmodified and untreated cotton cloth) being treated was sprayed evenly on the fabric from an aerosol spray container, and allowed to dry 24 hours before evaluation. Thereafter, each of the treated textile surfaces was then tested for spray ratings, employing the method described in the above-mentioned American Textile Colorist Method.

EXAMPLE 1

A methylpolysiloxane copolymer was prepared by cohydrolyzing 22.4 weight percent trimethylchlorosilane and 77.6 weight percent tetraethyl orthosilicate. The cohydrolysis was carried out in toluene, so that the final cohydrolysis product comprised 47 percent solids (in toluene) and the methyl/Si ratio was about 1.07. This polymer will hereinafter be referred to as an "MQ resin."

The following examples illustrate the preparation of water-repellent compositions employing various organopolysiloxane fluids free of substitution on the organic groups in combination with tetrabutyl titanate, the above identified MQ resin, and paraffin wax. The paraffin wax had an aniline melting point (A.M.P.) of 133° F. and was a refined grade of petroleum wax manufactured and sold by Gulf Oil Corporation. Unless stated otherwise, the proportion of ingredients was as follows.

Table I

Ingredients: Parts
Tetrabutyl titanate [Ti(OC$_4$H$_9$)$_4$]_____ 1.5
MQ resin (in form of a 47% toluene solution)_ 1.5
Organopolysiloxane fluid_____ 1.5
Paraffin wax_____ 4.0
Mineral spirits_____ 40.0
Freons 11 and 12 (equal parts)_____ 80.0

In some instances, one or more of the above ingredients were omitted from the aerosol container to determine the effect of such omission. Of the organopolysiloxane fluids employed, one such fluid (identified as "fluid I") was a linear methyl phenylpolysiloxane fluid of about 125 centistokes (at 25° C.) chain-stopped with trimethylsiloxy groups and containing both methyl groups and phenyl groups connected directly to silicon in which the phenyl groups were free of any substitution; this composition contained about 25 mol percent phenyl groups.

Another fluid used (identified as "fluid II") was also a methyl phenylpolysiloxane linear fluid of about 500 centistokes (at 25° C.) chain-stopped with trimethylsiloxy groups in which the phenyl groups were free of substitution; there were present about 40 mol percent silicon-bonded phenyl groups.

The composition of the mixture of ingredients based on U.S. Patent 2,672,455 (referred to in the following examples) is sold commercially and comprises the above-mentioned MQ resin, tetrabutyl titanate, and a linear methyl polysiloxane fluid chain-stopped with trimethylsiloxy units and containing only methyl groups in the linear polysiloxane chain; this composition was made up into an aerosol composition similarly as was done with the others.

Another organopolysiloxane used (identified as "fluid III") was a methyl hydrogen polysiloxane fluid of about 25 centistokes (at 25° C.) chain-stopped with trimethylsiloxy units and containing intermediate $$\begin{array}{c} CH_3 \\ | \\ Si-O \\ | \\ H \end{array}$$

units; such compositions are more particularly described in Wilcock Patent 2,491,843.

A still further organopolysiloxane fluid employed (identified as "fluid IV") was a mixture of 60 parts of fluid III and 40 parts of a trimethylsiloxy chain-stopped linear methylpolysiloxane of 25 centistoke viscosity (at 25° C.) containing for the most part dimethylsiloxy units and a small percentage of monomethylsiloxy units (CH$_3$SiO$_{3/2}$).

The following Table II shows results of spray ratings determined on cotton fabrics in which various combinations of tetrabutyltitanate, the MQ resin (methylpolysiloxane copolymer), and the organopolysiloxane fluids recited above, as well as paraffin wax were the variables. Where organopolysiloxane fluids were used, their use is indicated by the letter "x" which indicates the presence of this particular ingredient in the aerosol composition. In all the aerosol compositions employed in the following examples, the mineral spirits and the Freons were constant.

Table II

| Example No. | Tetra-butyl Titanate | MQ Resin | Fluid Organopolysiloxane | Paraffin Wax | Spray Rating on Cotton | | |
|---|---|---|---|---|---|---|---|
| 2 | | | | x | 0 | 0 | 0 |
| 3 | x | x | | x | 0 | 0 | 0 |
| 4 | Composition available commercially under U.S. 2,672,455 | | | | 0 | 50 | 0 |
| 5 | Same as Example 4 | | | x | 70 | 70 | 70 |
| 6 | x | x | Fluid I | | 0 | 90 | 100— |
| 7 | x | x | ___do___ | x | 100 | 100— | 100— |
| 8 | x | x | Fluid II | | 90 | 80 | 100— |
| 9 | x | x | ___do___ | x | 100— | 100 | 100— |
| 10 | x | x | Fluid IV | | 80 | 80 | 70 |
| 11 | x | x | ___do___ | x | 100 | 90— | 90— |
| 12 | x | x | Fluid III | | 80 | 80 | 90 |
| 13 | x | x | ___do___ | x | 90+ | 100 | 100 |

It will be noted from the results described in Table II that in every instance the incorporation of paraffin wax improved the spray rating of the treated textile cloth. In some respects, the spray rating improvement was quite marked and raised the water-repellent from a substandard material to a highly useful composition giving it more universal application, particularly in connection with Examples 4 and 5, where the usual leather water-repellent recited in U.S. Patent 2,672,455 was raised from a useless material for rendering textiles water-repellent to a status where the incorporation of the wax enabled it to be employed in textile water-repellent applications.

The presence of the waxes, for instance, the paraffin wax, materially improves the feel of the treated fabrics without harming the water-repellency. The improvement and feel of the treated cotton fabric was evidenced by a reduction in slight tackiness of the fabric without the wax present thereon and material softening of the surface of the treated fabric.

It will, of course, be apparent to those skilled in the art that in addition to the proportions of ingredients described above within the purview of my invention, other proportions of ingredients may be employed, as well as other types of organopolysiloxanes free of substitution on the organic groups, other methylpolysiloxane copolymers, titanates, waxes, etc., without departing from the scope of the invention. The proportions of ingredients may be varied widely as will be apparent from the preceding description of the invention. Other textiles such as nylon, acrylonitrile fibre fabrics, polyester fibre fabrics, wool, rayon, silk, etc., may be treated in accordance with the practice of the present invention to render the same water-repellent and to give the improved results found in the treatment of the cotton textiles.

What I claim as new and desire to secure by Letters Patent of the United States is:

1. A composition of matter consisting essentially of by weight, (1) from 10 to 60 percent tetrabutyl titanate, (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid organopolysiloxane in which the organic groups are selected from the class consisting of methyl and phenyl groups and are attached to silicon by carbon-silicon linkages, there being present from 1.96 to 2.25 organic groups per silicon atom, the said fluid organopolysiloxane having a viscosity of from 5 to 1,000,000 centistokes when measured at 25° C., (4) a paraffin wax, (5) a volatile fluoroalkane carrier, and (6) a volatile aliphatic hydrocarbon solvent.

2. A composition of matter consisting essentially of by weight, (1) from 10 to 60 percent tetrabutyl titanate, (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid methyl phenylpolysiloxane containing an average of from 1.96 to 2.25 total methyl and phenyl groups per silicon atom and having a viscosity of from 5 to 1,000,000 centistokes when measured at 25° C., (4) a paraffin wax, (5) a fluoroalkane volatile carrier, and (6) a volatile aliphatic hydrocarbon solvent.

3. A composition of matter consisting essentially of by weight, (1) from 10 to 60 percent tetrabutyl titanate, (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) a methylpolysiloxane fluid containing an average of from 1.96 to 2.25 methyl groups per silicon atom and having a viscosity of from 5 to 1,000,000 centistokes when measured at 25° C., (4) a paraffin wax, (5) a fluoroalkane volatile carrier, and (6) a volatile aliphatic hydrocarbon solvent.

4. The process for rendering textiles water-repellent which comprises applying to the surface of the textile from an aerosol container a pressurized mixture of ingredients consisting essentially of by weight, (1) from 10 to 60 percent of a titanium compound selected from the class consisting of (a) orthotitanates having the general formula $Ti(OR)_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid hydrocarbon-substituted polysiloxane in which the hydrocarbon groups are selected from the class consisting of methyl and phenyl radicals, there being present from 1.96 to 2.25 hydrocarbon groups per silicon atom, and (4) a wax selected from the class consisting of paraffin waxes, beeswax synthetic hydrocarbon waxes, microcrystalline waxes, oxidized microcrystalline waxes, ceresin wax, Japan wax, and halogenated paraffin waxes.

5. The process for rendering textiles water-repellent which comprises applying to the surface of the said textiles from an aerosol container a pressurized mixture of ingredients consisting essentially of by weight, (1) from 10 to 60 percent of a titanium compound selected from the class consisting of (a) orthotitanates having the formula $Ti(OR)_4$ where R is a member selected from the class consisting of aliphatic hydrocarbon radicals of less than 12 carbon atoms and hydroxylated and aminated aliphatic hydrocarbon radicals of less than 12 carbon atoms and containing less than four hydroxy radicals, and (b) aliphatic hydrocarbon-soluble partial hydrolyzates of (a), (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a fluid methylpolysiloxane having a ratio of from 1.96 to 2.25 methyl groups per silicon atom, and (4) a wax selected from the class consisting of paraffin waxes, beeswax, synthetic hydrocarbon waxes, microcrystalline waxes, oxidized microcrystalline waxes, ceresin wax, Japan wax, and halogenated paraffin waxes.

6. The process for rendering textiles water-repellent which comprises applying to the surface of said textile from an aerosol container a pressurized mixture of ingredients consisting essentially of by weight, from 10 to 60 percent tetrabutyl titanate, (2) from 25 to 75 percent of a methylpolysiloxane copolymer composed essentially of trimethylsiloxy units and $SiO_2$ units wherein said units are in such proportion that the ratio of methyl groups to silicon atoms ranges from about 1 to 1.25 methyl groups per silicon atom, (3) from 10 to 50 percent of a methylpolysiloxane having a ratio of from 1.96 to 2.25 methyl groups per silicon atom, said methylpolysiloxane having a viscosity of from 10 to 10,000 centistokes when measured at 25° C., and (4) a paraffin wax.

References Cited in the file of this patent

UNITED STATES PATENTS

| | | |
|---|---|---|
| Re. 23,879 | Currie | Sept. 28, 1954 |
| 2,807,554 | Serey et al. | Sept. 24, 1957 |

OTHER REFERENCES

Warth: "The Chemistry and Technology of Waxes," 2nd edition, Reinhold Pub. Co., 1956, pages 398 and 855.